United States Patent [19]

Mack

[11] 4,325,798

[45] Apr. 20, 1982

[54] SELF-ENERGIZING WATER TREATMENT ACCESSORY

[76] Inventor: Michael H. Mack, 1511 Pipeline Rd., #188, Chino, Calif. 91710

[21] Appl. No.: 163,436

[22] Filed: Jun. 27, 1980

[51] Int. Cl.³ .......................... C25B 9/00; C25B 11/04
[52] U.S. Cl. .................................... 204/248; 204/275; 204/286; 204/292
[58] Field of Search ...................... 204/150, 248–249, 204/275, 286, 100, 96, 292

[56] References Cited

U.S. PATENT DOCUMENTS

| | | | |
|---|---|---|---|
| 2,523,443 | 9/1950 | Mogck | 204/275 X |
| 2,524,511 | 10/1950 | Butler | 204/248 |
| 2,687,996 | 8/1954 | Butler | 204/248 |
| 3,342,712 | 9/1967 | O'Keefe, Sr. | 204/150 X |
| 3,425,925 | 2/1969 | Fleischmann | 204/150 X |
| 3,686,092 | 8/1972 | Stehlin | 204/150 X |

Primary Examiner—Delbert E. Gantz
Assistant Examiner—Donald R. Valentine
Attorney, Agent, or Firm—William C. Babcock

[57] ABSTRACT

A self-energizing water treating assembly capable of being either removably disposed in a container through which a stream of water flows or in a tank containing a stationary body of water to render the water slightly alkaline, remove free dissolved oxygen from the water, forms gelatinous thixotropic suspensions that envelops foreign particled material in the water and render the same substantially tasteless and odorless, and minimizes the tendency of minerals in the water being deposited as hard scale on the tubes or containers in which the water is heated or transformed to steam.

3 Claims, 5 Drawing Figures

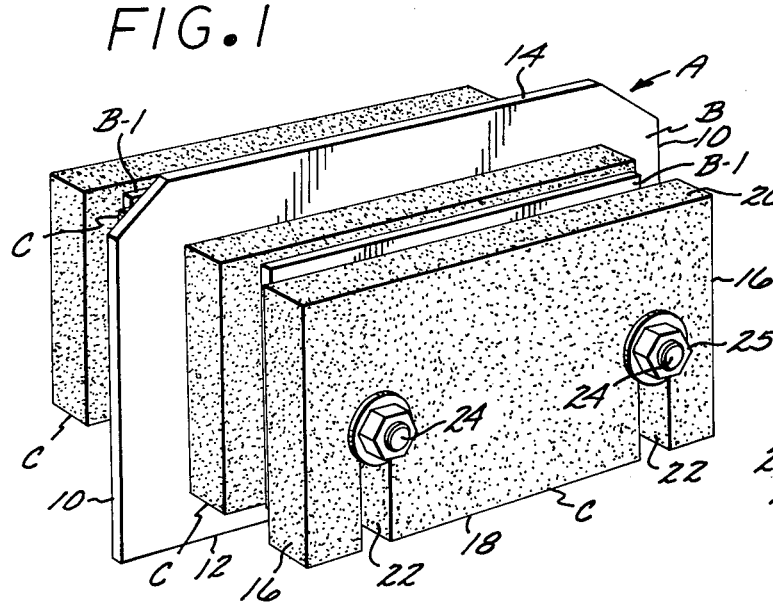
FIG. 1
FIG. 2
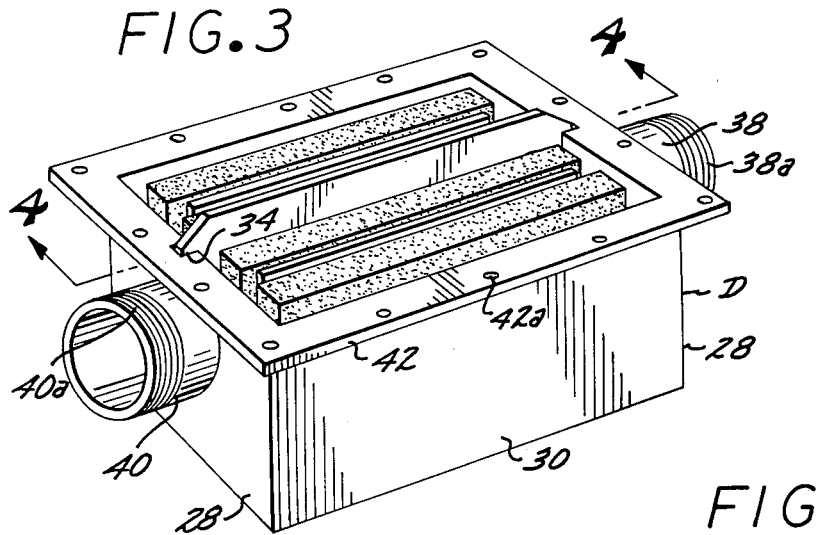
FIG. 3
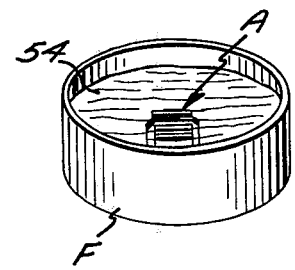
FIG. 5
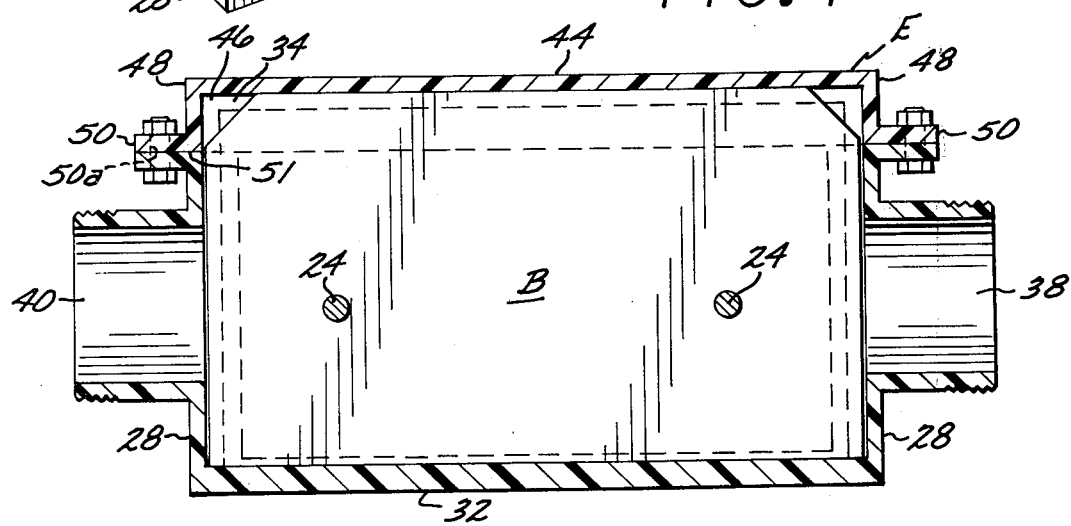
FIG. 4

SELF-ENERGIZING WATER TREATMENT ACCESSORY

BACKGROUND OF THE INVENTION

1. Field of the Invention

Self-Energizing Water Treatment Accessory.

2. Background of the Invention

On Sept. 19, 1967 U.S. Pat. No. 3,342,712 was issued to William O'Keefe on a Water Conditioning Method and Apparatus that was subsequently assigned to the present applicant and commercialized by him throughout the United States. In the O'Keefe invention rods of a magnesium bearing material were contained in a copper housing through which the water to be treated flowed, and the copper housing electrically connected to an iron piping system that was to be protected against corrosion. The copper housing was of massive structure, and with the increased cost of copper, installations made in accordance with the O'Keefe concept were unduly expensive.

The applicant has found that the expensive copper housing previously deeded necessary may be dispensed with, and that a self-energizing unit may be used to treat either a flowing stream of water or a stationary body of water without the use of a copper housing.

Accordingly, a major object of the present invention is to supply a self-energizing water treatment device for use on either a flowing stream of water or a stationary body thereof to render the same slightly alkaline, to alter the ratio of permanent to temporary hardness, to de-oxygenate the water, and to sequentially discharge magnesium ions into the water that reacts therewith to form tasteless lyophilic colloidal magnesium hydroxide that envelops taste or odor imparting particles in the water and mark the taste or odor thereof.

Yet another object of the invention is to so treat the water that there is a minimum tendency for hard scale to be deposited therefrom when flowing through pipes or tubes or when contained in a tank, both when the water is hot or cold, and the treated water also tending to soften and remove deposited scale.

Yet further objects of the invention are to so treat water that it may have therapudic value, particularly to those persons that are suffering from a magnesium deficiency resulting from failing to eat a diet deficient in certain minerals.

These and other objects of the invention will become apparent from the following description of a preferred form thereof and the drawing illustration that follows.

SUMMARY OF THE INVENTION

The self-energizing water conditioning unit includes a first stiff rectangular copper plate that has second copper plates of lesser size disposed on opposite sides thereof. Relatively thick magnesium plates are disposed on opposite sides of the first copper plate and have the second copper plates disposed therebetween. Both the first and second copper plates and the magnesium plates have transversely aligned slots that extend upwardly from the bottoms thereof and through which copper bolts having copper spacers mounted thereon to removably maintain the assembly in the configuration shown in FIG. 1. The assembly above described by loosening nuts that engage the bolts, magnesium plates that have been corroded due to the galvanic action between them and the copper plates may be lifted out of the assembly and replaced by new magnesium plates. The nuts previously mentioned are then tightened to hold the assembly together as a unit.

The assembly may be used to treat water in either of two ways. If the water is flowing, a housing is provided that has an inlet and a longitudinally spaced outlet. The housing has an internal longitudinally extending slot therein that removably engages marginal end and side portions of the first copper plate. A first flange extends outwardly from the housing that is engaged by a second flange that forms a part of a top, and the top also having an internal longitudinal slot therein that engages the first copper plate. A resilient gasket is interposed between the flanges, and the flanges being removably secured to one another by bolts.

Water as it flows through the housing encounters the sequence of copper and magnesium plates previously described, with the flow becoming turbulent, and the water being subjected to a galvanic electric current that results in magnesium from the plates sequentially being transformed from the metallic to the ionic state. The ionic magnesium reacts with the water to form colloidal magnesium hydroxide and provide the operational advantages previously mentioned. In those situations where a body of water is stationary, the assembly is simply immersed therein as shown in FIG. 5 of the drawing, with the operational advantages being the same as previously described in connection with the housing.

BRIEF DESCRIPTION OF THE DRAWINGS

FIG. 1 is a perspective view of the self-energizing water treating assembly;

FIG. 2 is an end elevational view of the assembly;

FIG. 3 is a perspective view of the assembly disposed in a housing through which the water to be treated flows;

FIG. 4 is a longitudinal cross-sectional view of the housing and assembly shown in FIG. 3 and taken on the line 4—4 thereof; and FIG. 5 is a perspective view of the assembly immersed in a tank containing the water to be treated.

DESCRIPTION OF THE PREFERRED EMBODIMENT

The self-energizing water treatment assembly as shown in perspective in FIG. 1 and includes a first rectangular copper plate B that has one or more second copper plates B-1 situated on opposite sides thereof. A number of relatively thick magnesium plates C are provided, with at least one plate being situated on each side of the first rectangular copper plate B. In FIG. 2 it will be seen that both the second copper plate B-1 and the magnesium plates C are of substantially smaller size than the first copper plate B for reasons that will later become apparent.

The first copper plate B has a pair of parallel end edges 10, a lower longitudinally extending edge 12, and an upper longitudinal edge 14. Each of the magnesium plates C as may be seen in FIG. 1, as well as in FIG. 2, have a pair of end edges 16, a lower longitudinal edge 18, and an upper longitudinal edge 20. The second copper plates B-1 are of substantially the same dimension as the magnesium plate C previously described but are illustrated in FIG. 2 as being of substantially lesser thickness.

Both the first copper plates B, the second copper plates B-1 and the magnesium plate C each have at least one set of transversely aligned slots 22 that extend upwardly from the lower edges thereof as best seen in FIG. 1. Each of the sets of slots 22 engages a heavy copper bolt 24 that has a number of copper washers mounted in spaced relationship thereon, which spacers serve to hold the first copper plate, the second copper plates B-1, and the magnesium plate C in laterally spaced relationship on the bolt 24 as illustrated in FIG. 2. The bolt 24 has a head 24a thereon that abuts against one of the magnesium plates C as shown in FIG. 2 and the opposite end of the bolt being engaged by a nut 25. When the nut 25 is tightened on the bolt 24 the assembly A is removably held in the configuration illustrated in FIGS. 1 and 2, with each of the magnesium plates C being in electrical contact with the first rectangular copper plate B and second copper plates B-1 to effect a multiple galvanic cell.

The invention A above-described may be used in conjunction with a housing D illustrated in FIG. 3 when the water to be treated is flowing, or the assembly A may be immersed in a tank F as shown in FIG. 5 containing a stationary body of water 54 that is to be treated by the invention A. The invention A when used to treat a moving body of water is removably disposed in a housing D illustrated in FIG. 3 that is of generally rectangular shape, and that has a pair of end walls 28, a pair of side walls 30, and a flat bottom 32. A longitudinal slot 34 is formed on the interior of the housing D and extends downwardly along the interior surfaces of the pair of end walls 28 and along the interior surface of the bottom 32.

In FIG. 3 it will be seen that a flange 36 extends outwardly from the upper ends of the pair of end walls 28 and side walls 30. A tubular inlet for water 38 extends outwardly from one of the end walls 28 and has threads or other fastening means provided thereon to connect it to a source of water which threads are identified by the numeral 38a. Water after discharging through the housing D flows from a tubular outlet 40 that projects from one of the end walls 28, and the outlet 40 also having threads or other fastening means 40a provided thereon for connection to the piping system to which it is desired to have the treated water flow. The first flange 42 as may be seen in FIG. 3 has a number of spaced openings 42a formed therein.

A cover E is provided that is illustrated in FIG. 4, and which cover includes a flat top 44 that has a pair of end walls 48, and a pair of side walls 46 projecting downwardly therefrom, which side walls and end walls develop into an outwardly extending second flange 50. The second flange 50 has a number of spaced openings 50a formed therein that are vertically alignable with the openings 42a. A resilient gasket 51 is sandwiched between the flanges 42 and 50 to effect a seal therebetween. A number of second bolts 52 are provided that extend through the aligned openings 42a and 50a as shown in FIG. 4 and cooperate with the gasket 51 to maintain the interior of the housing water-tight so that all the water flowing through the inlet 38 will discharge through the outlet 40 after the water has been treated. Due to the transversely spaced configuration of the first rectangular copper plate and second copper plates B-1 relative to the magnesium plate C, spaces are provided therebetween, and the flow of water from the inlet 38 through the interior of the housing is turbulent prior to it discharging through the outlet 40. The turbulent flow results in all of the water being concurrently in contact with the first and second copper plates B, B-1 and magnesium plates, and during this time the water is subjected to a galvanic action as electric current flows between the magnesium plates C and the copper plates B, B-1. The cover E has a continuation of the slot 34 therein, and this slot in the top 44 engages the upper marginal portion of the copper plates B to maintain the first copper plate B, second copper plates B-1 and the magnesium plate C in a fixed relationship in the interior of the housing D.

A portion of the slot 34 in the top 22 of cover E is shown in FIG. 4, and it will be noticed that this slot also continues downwardly in the end walls 48 of the cover. In FIG. 1 it will be seen when the first copper plate and second copper plate B-1 as well as the magnesium plate C are disposed in the arrangement shown in this figure and separated by the spacers 26, with the bolt extending through the slots 22, that it will so remain as long as the nut is tightened on the bolt. When nut 25 is loosened, any desired one of the magnesium plate C may be slipped upwardly from the assembly, removed therefrom and a new magnesium plate C substituted in its stead. If desired, all of the magnesium plates C may be concurrently removed therefrom, and replaced by new magnesium plates.

During the time that water flows through the housing D, it is subjected to the galvanic action of the assembly A, and as the metallic magnesium of the plate C assumes the ionic form, the water is rendered slightly alkaline due to the formation of magnesium hydroxide, and due to the reactivity of the magnesium ions dissolved oxygen it removed from the water, and the magnesium hydroxide formed is in a gelatinous colloidal form that envelops foreign materials or particles in the water that have objectional taste or odor characteristics but with this objectional feature being eliminated due to the foreign particles being enveloped in a gelatinous coating of high magnesium hydroxide that masks the taste or odor. Also, the assembly due to the formation of the colloidal mangesium hydroxide tends to minimize the tendency of minerals in the water to be deposited as hard scale in tubes or tanks into which it discharges, as well as such scale being precipitated when the water is heated in the tubes or tanks.

Water treated by flowing through the housing D has the magnesium content thereof increased, and recent medical research has indicated that increased magnesium in the diet of a person may have desirable results on his health or well being. To provide water that is rich in magnesium and that is desired to be used by persons who believe that magnesium does have theraputic value relative to their well being, the assembly A may be immersed in a tank F as shown in FIG. 5, to transform water 54 therein into water with a high magnesium content that may be sequentially used as desired by such persons. The housing D and the cover E are preferably formed from a non-toxid inert polymerized resin.

The use and operation of the invention has been described previously in detail and need not be repeated.

What is claimed is:

1. A self energizing water treatment assembly that includes:
    a. a first generally rectangular copper plate having upper and lower edges and a pair of end edges, with at least one transverse slot that extends upwardly from said lower edge;
    b. a plurality of generally rectangular second copper plates and magnesium plates that have lower edges from which transverse slots extend upwardly that may be laterally aligned with said slot in said first copper plate;

c. a metal electrical conducting bolt having a head and a free threaded end that may be inserted in said slots;

d. a plurality of spacers on said bolt that hold said first and second copper plates and magnesium plates in laterally spaced relationship;

e. a nut that engages said threads on said bolt, said bolt when tightened holding said assembly together as an integral unit, said nut when loosened permitting a desired one or all of said plates to be lifted from said bolt and replaced by plates that have not been subjected to water.

2. An assembly as defined in claim 1 in which f. said first copper plate is of greater length and width than said second copper plates and said magnesium plates.

3. An assembly as defined in claim 2 which in addition includes:

g. a housing assembly formed from a non-electrical conducting material, said assembly including a box having a pair of side walls and end walls and a bottom, a water inlet and outlet in said pair of end walls, longitudinal slots on the inner surface of said pair of end walls, said slots removably engaging marginal edge portions of said first copper plate; a cover mounted on said box, said cover having a longitudinal slot on the inner surface thereof that removably engages a marginal edge portion of said first copper plate; means for removably securing said top to said box.

* * * * *